Feb. 23, 1965    M. W. TOMPKINS ETAL    3,170,385
AIR SCREEN STRUCTURE COMPONENTS AND METHOD OF OPERATION
Filed Oct. 18, 1961    7 Sheets-Sheet 1

INVENTORS
MELVIN W. TOMPKINS
WILLIAM L. ELLIS

By Cromwell, Greist & Warden
ATTYS.

INVENTORS
MELVIN W. TOMPKINS
WILLIAM L. ELLIS
Cromwell, Greist & Warden
Attys.

Feb. 23, 1965 M. W. TOMPKINS ETAL 3,170,385
AIR SCREEN STRUCTURE COMPONENTS AND METHOD OF OPERATION
Filed Oct. 18, 1961 7 Sheets-Sheet 3

INVENTORS
MELVIN W. TOMPKINS
WILLIAM L. ELLIS
By Cromwell, Greist & Warden
Attys.

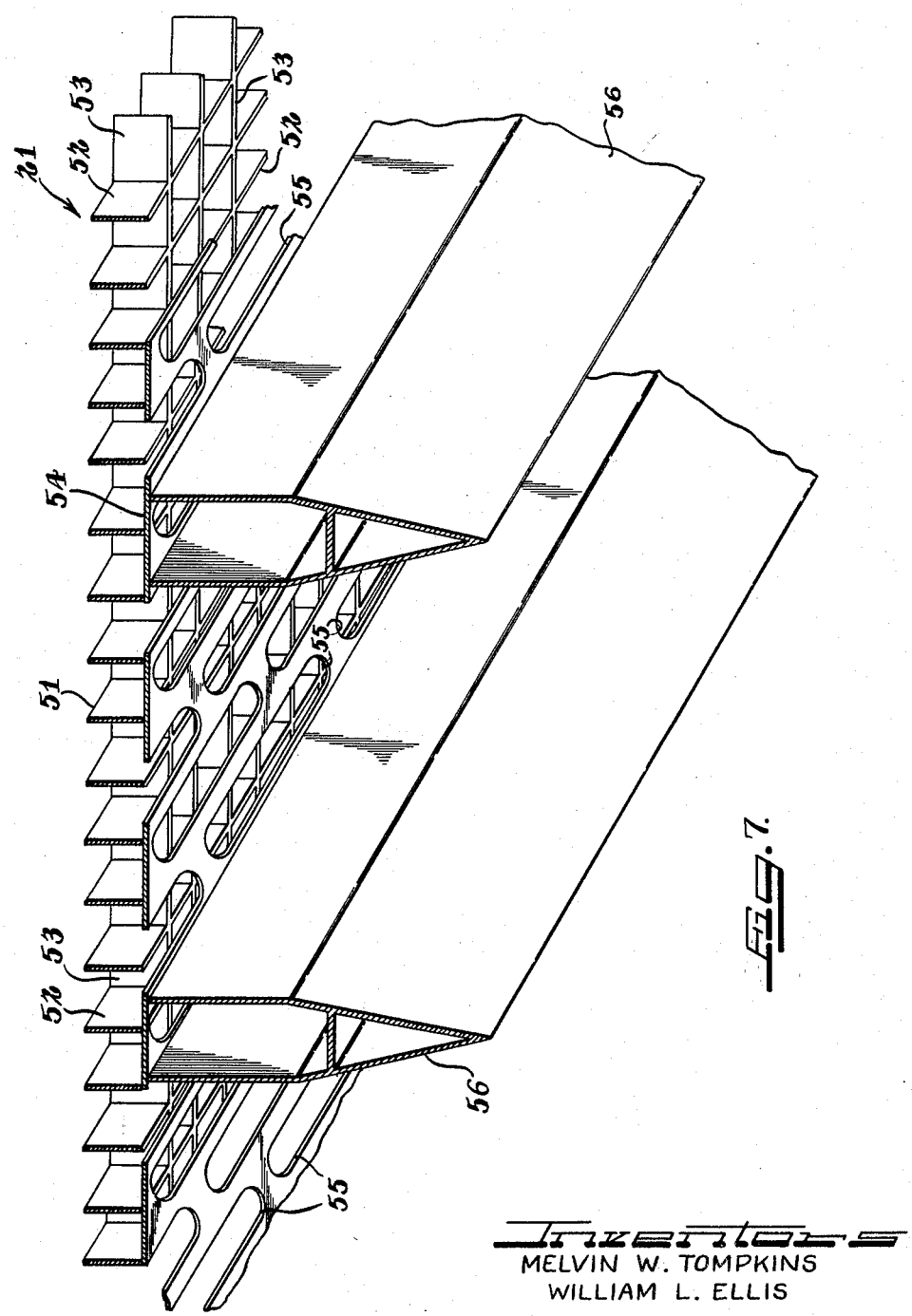

Feb. 23, 1965  M. W. TOMPKINS ETAL  3,170,385
AIR SCREEN STRUCTURE COMPONENTS AND METHOD OF OPERATION
Filed Oct. 18, 1961  7 Sheets-Sheet 6
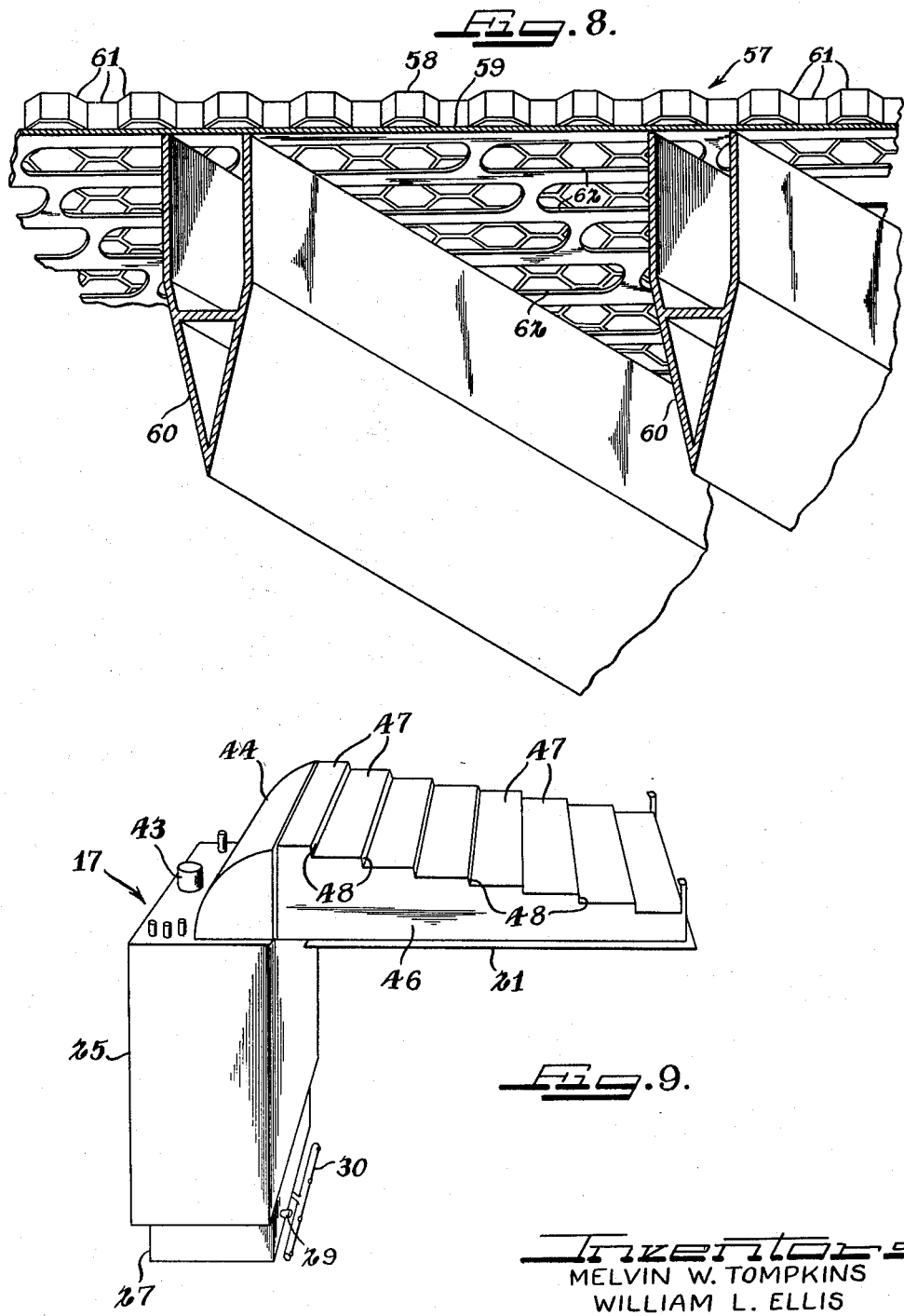
Inventors
MELVIN W. TOMPKINS
WILLIAM L. ELLIS
by Cromwell, Greist & Warden
Attys.

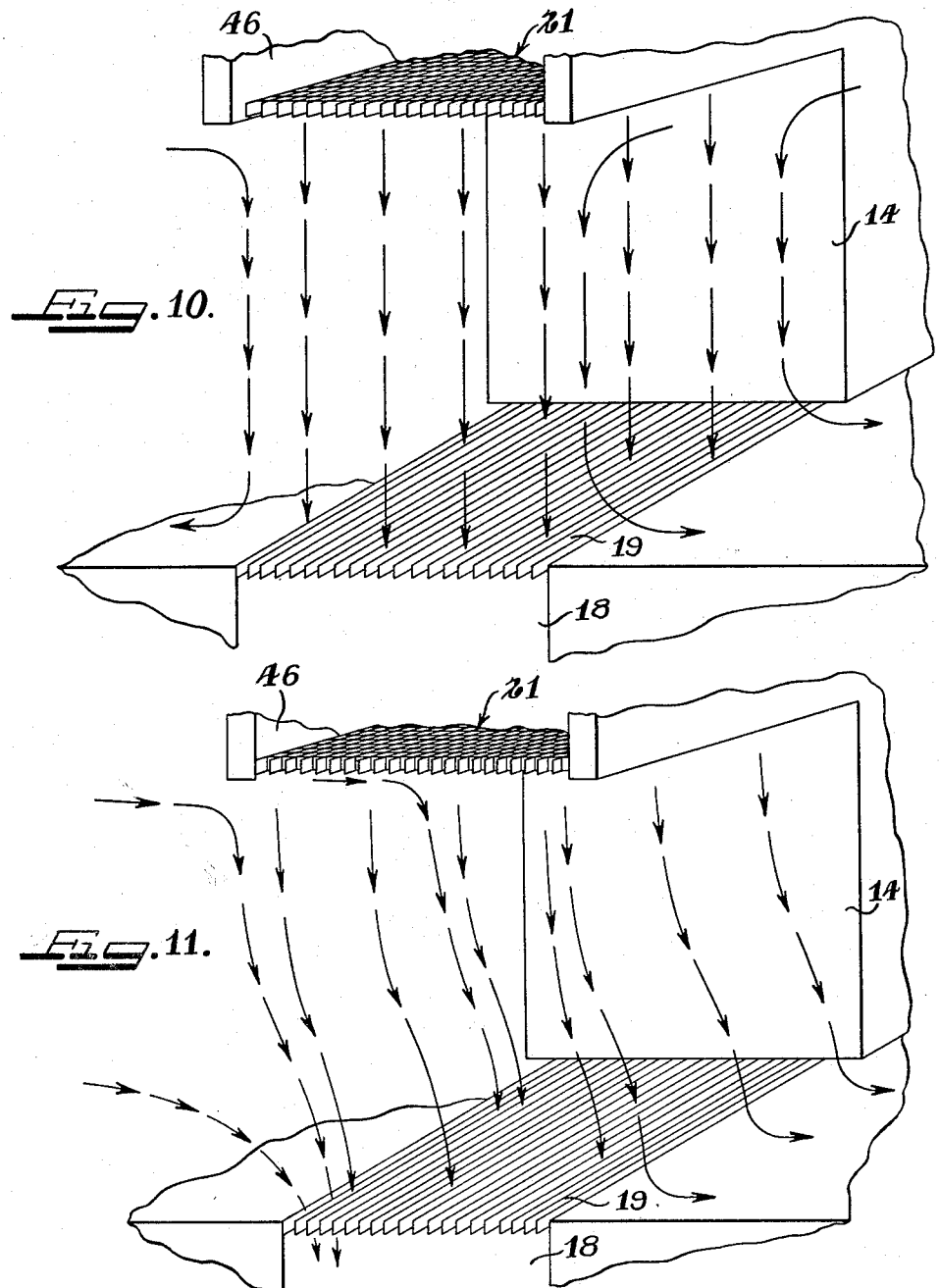

United States Patent Office 3,170,385
Patented Feb. 23, 1965

---

3,170,385
AIR SCREEN STRUCTURE COMPONENTS AND METHOD OF OPERATION
Melvin W. Tompkins and William L. Ellis, both of New Castle, Ind., assignors to New Castle Products, Inc., New Castle, Ind., a corporation of Indiana
Filed Oct. 18, 1961, Ser. No. 145,889
5 Claims. (Cl. 98—36)

The invention relates to a new and improved air screen structure and new and improved components therefor, the structure and components providing for a new and improved method of operation also constituting a part of the invention. More specifically, the invention is directed to a new and improved method and means for defining and controlling an air screen established in an entranceway by air recirculating equipment.

The use of air screens or barriers to separate the interior and exterior of a building structure in an entranceway is becoming rather widespread. Air screens provide many advantages including, among other things, the elimination of mechanical doors and conditioned air loss attendant to the operation of such doors. As will be described in greater detail below, the original commercial concept of air screen structure operation involved the basic principle of varying the direction and/or velocity of the air screen to counteract changing pressure conditions between the interior and exterior of a building. Until this invention, it has been an accepted principle that an air screen, in order to be effective, must be slanted toward the high pressure area and that such an area will exist either in the interior of the building or exteriorally thereof with its location subject to rather rapid change. Accordingly, air screen structures have been fabricated using overhead air discharge directional control means defining the air screen and capable of changing the direction of the screen from the vertical to an angled slanted position either toward the interior of the building or the exterior thereof.

With the present invention it has been found that the foregoing conventional concept of air screen operation is undesirable. Instead, it has been found that effective closure control is obtained by the utilization of a consistently vertically defined air screen of sufficient constant velocity and depth capable of withstanding rather extreme variations in entranceway pressure differential. Accordingly, it is an object of the invention to provide a new and improved air screen structure and method of operation which take full advantage of the improved concept of air screen utilization.

Another object is to provide a new and improved plenum structure for use in an air screen unit, the plenum structure including means to control air flow therethrough to establish a stable and highly efficient air screen.

A further object is to provide a new and improved air discharge grating structure particularly adapted for use with the plenum structure of the invention, the grating structure providing for controlled and consistent air screen definition and maintenance in a new and improved manner.

Still a further object is to provide a new and improved air screen recirculatory type structure which makes full utilization of the improved concept of air screen definition and control, the structure being of economical compact design.

Other objects not specifically set forth will become apparent from the following detailed description of the invention made in conjunction with the accompanying drawings wherein:

FIG. 7 is a fragmentary perspective of one form of air discharge grating means forming a part of the invention, this view illustrating the grating means from a point below the installed position of the same;

FIG. 8 is a view similar to FIG. 7 illustrating a modified form of air discharge grating means;

FIG. 9 is a partly schematic perspective of the basic package unit of the air screen structure adapted for ready installation in a building;

FIG. 10 is a diagrammatic illustration of operation of the air screen structure; and FIG. 11 is a view similar to FIG. 10 illustrating operation under varying conditions.

Figure 1:
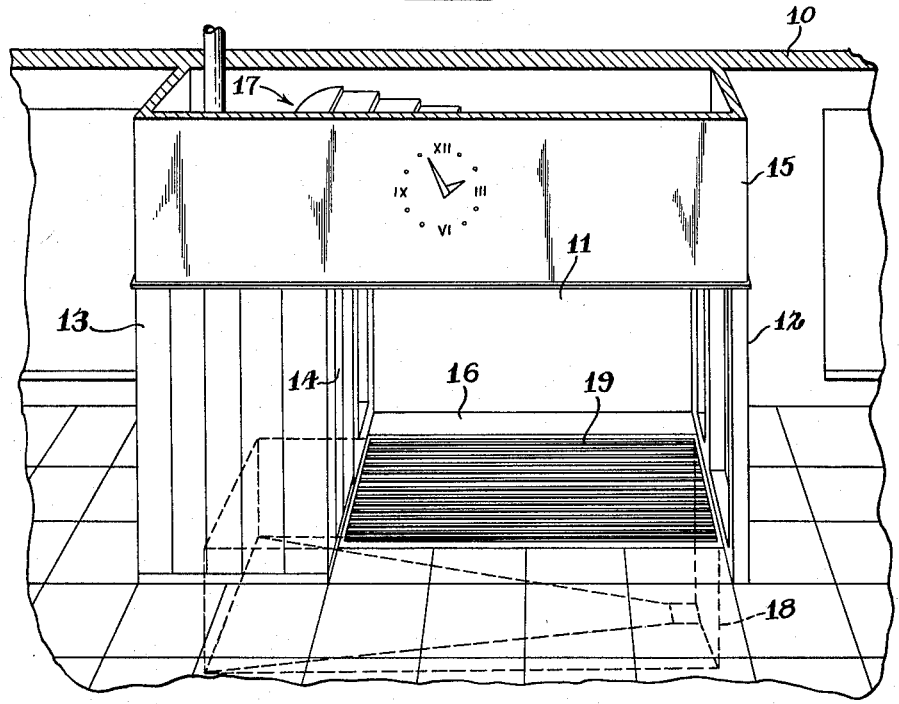
FIG. 1 is a fragmentary perspective of an installed air screen structure of the present invention.

FIG. 1 illustrates a typical air screen installation utilizing the improved components and method of operation of the present invention. The outside wall 10 of a building is provided with an unimpeded access opening 11 extended on one side by an inward passageway-defining wall 12, on the other side by a box-like structure 13 having an inner wall surface 14 which is coextensive with the side wall 12, a box-like depending ceiling structure 15 having a lowered ceiling surface coextensive with the side wall surfaces 12 and 14, and a floor surface 16 which is also coextensive with the ceiling and side wall surfaces. The structure described defines an elongated rectangular entranceway or passageway which extends into the building and which centrally thereof is separated by a downwardly moving air screen of a type to be described. The box-like structure 13 has suitably mounted therein an air moving unit generally designated by the numeral 17, this unit including a unique air discharge plenum which extends transversely across the overhead box-like structure 15 above the ceiling surface of the entranceway. The floor 16 of the building includes a recessed air return plenum or pit 18 located directly below the floor portion of the entranceway and a suitable type of open grill or grating 19 covers a substantial top portion of the pit 18 to permit air flow thereinto and functions as the supporting floor surface in a part of the entranceway.

Figure 2:
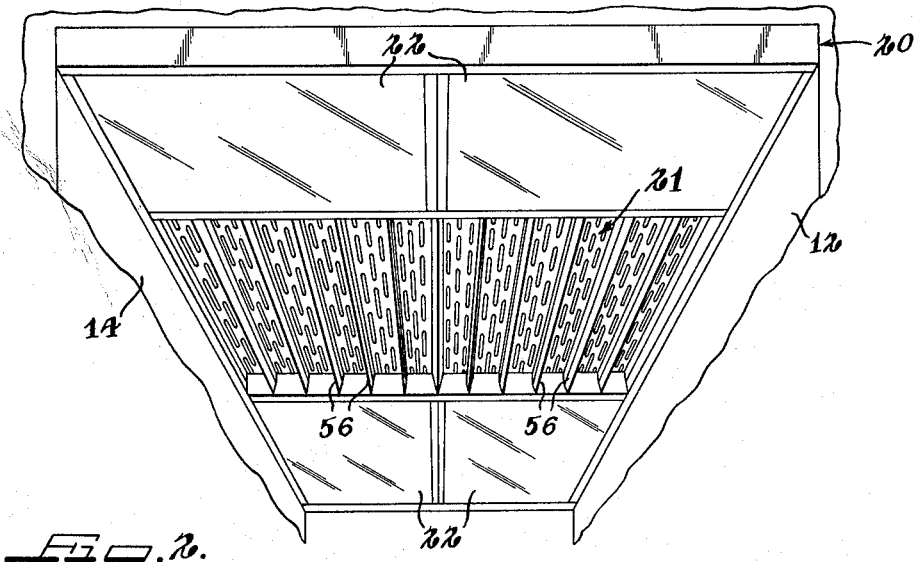
FIG. 2 is a fragmentary perspective of the ceiling of the entranceway of the installation of FIG. 1 as viewed upwardly from one end thereof.

FIG. 2 illustrates the ceiling 20 forming a part of the structure and including centrally thereof a transversely extending air discharge grating means 21 providing for the introduction of air downwardly into the entranceway and toward the floor grating 19 for recirculation of the air through the pit 18 and the air moving unit 17. Toward opposite ends of the air discharge grating 21 in the direction of traffic in the entranceway, a plurality of translucent panels 22 complete the ceiling closing off the overhead box-like structure 15 and permitting entranceway lighting.

Figure 3:
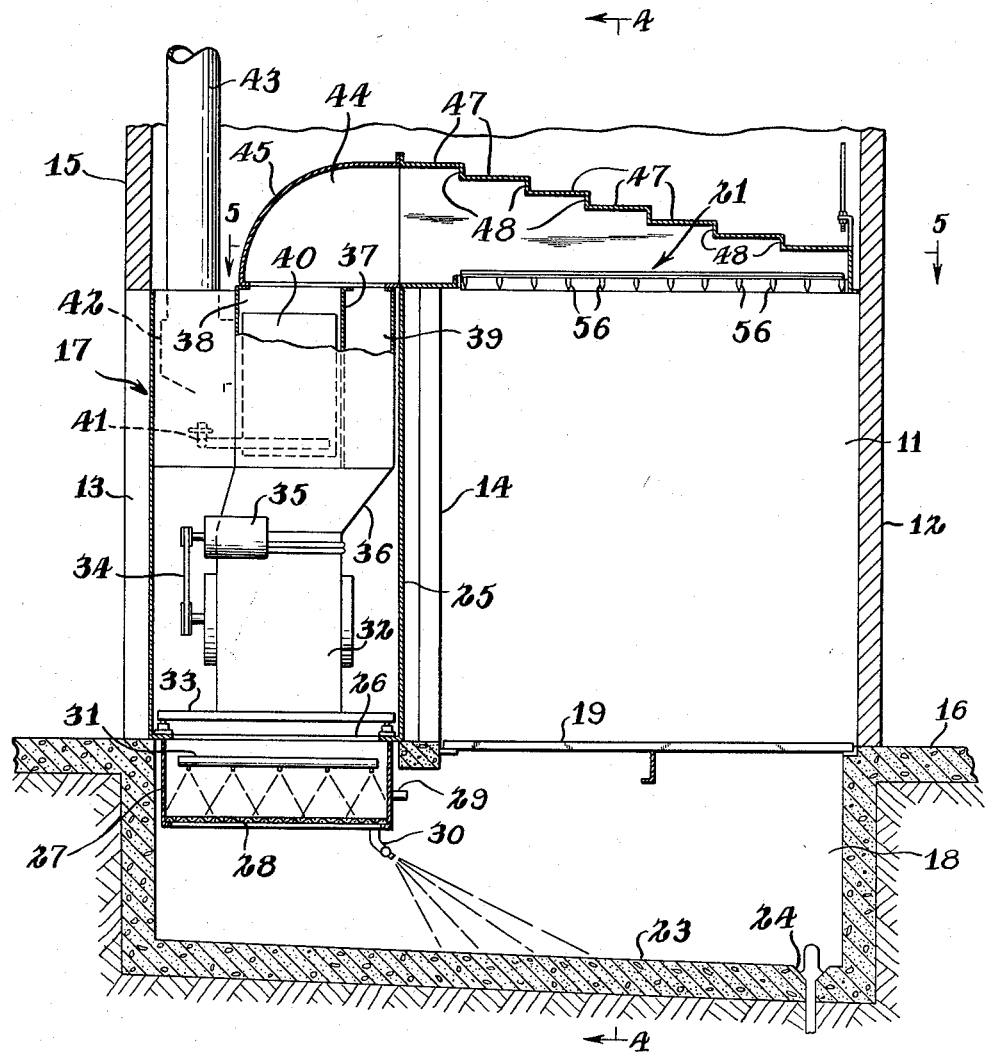
FIG. 3 is a fragmentary transverse section of the installed air screen structure.
Figure 4:
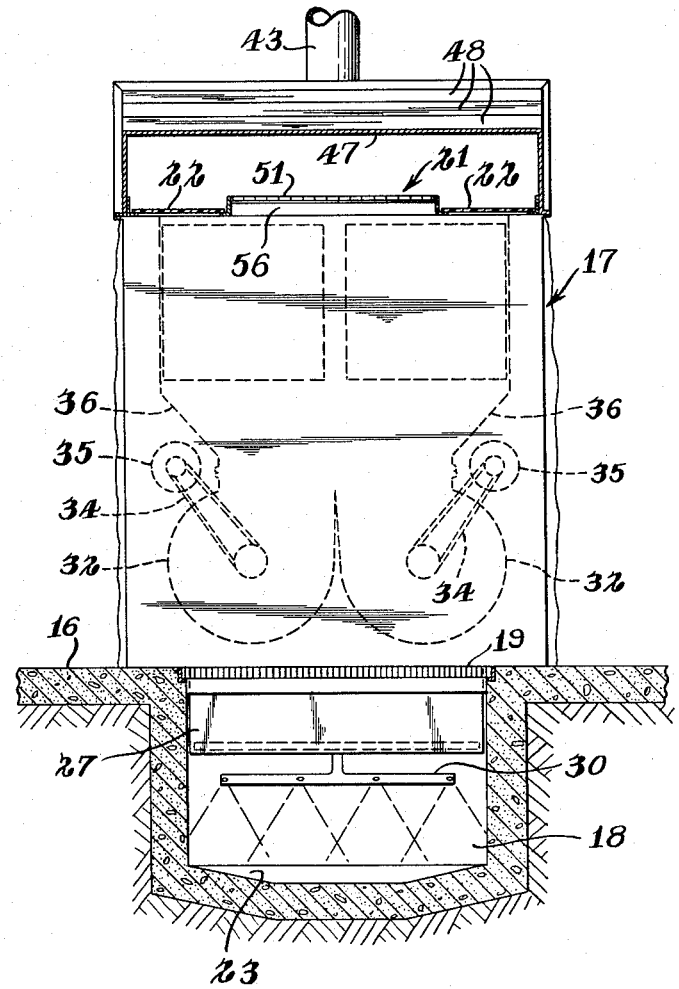
FIG. 4 is a fragmentary section of the structure as viewed generally along line 4—4 in FIG. 3.
Figure 5:
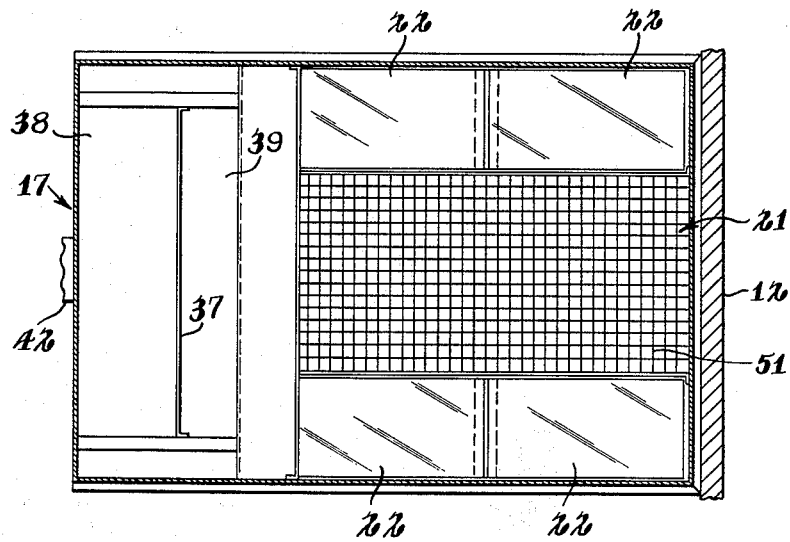
FIG. 5 is a fragmentary plan section taken through the air discharge plenum of the structure as viewed generally along line 5—5 of FIG. 3.

FIGS. 3 and 4 best illustrate certain of the basic components of the structure. The pit 18 is formed with a suitable bottom wall 23 which is sloped toward one end having a conventional drain 24 formed therein. The pit 18 extends from below the grating 19 to one side of the structure below the box-like portion 13 in which the air circulating unit 17 is mounted. This unit is in completely prefabricated form for ready installation in the environment described. Generally, the unit 17 includes a main vertical casing 25 provided at the bottom thereof with an air flow opening 26 in communication with a depending air filtering unit 27 which is closed at the bottom by a transversely extending filter element 28. Water supply inlet means 29 is carried by the filter unit 27 and it is in communication with a depending water spray 30 which projects downwardly into the pit 18 toward the drain 24 and which periodically operates to flush the pit 18 to remove debris therefrom. The water inlet 29 is also connected to a spray 31 mounted in the filter unit 27 above the filter element 28, this spray being periodically operated to clean the filter element 28, the water used being directed through the element 28 into the pit 18 for removal therefrom by the drain 24.

As best illustrated in FIG. 4, a pair of air moving fan-type units 32 are mounted in the lower end of the housing 25 immediately above the filter unit 27. These units as shown in FIG. 3 are resiliently supported on base frame members 33. Each fan unit is suitably driven through a drive belt arrangement 34 by a motor 35. Air flow ducts 36 extend upwardly from the fan unit 32 and, as best shown in FIG. 3, are each subdivided by an internal vertical baffle 37 into a heated air duct 38 and a cold air by-pass duct 39. These ducts extend upwardly into approximately the horizontal plane of the ceiling surface of the entranceway in which the air discharge grating 21 is mounted. The heated air ducts 38 each have mounted therein a vertical flow heater unit 40 which, in the form illustrated, is operated by gas supplied through a line 41 and which is in communication with a manifold 42 extending into communication with an exhaust stack 43. This stack extends upwardly out of the structure as shown in FIG. 1 and is suitably vented out of the building.

Located above the ceiling surface of the entranceway 11 and forming a part of the air moving unit is mixing chamber 44 into which heated air from the ducts 38 and cold air from the ducts 37 flows. The mixing chamber 44 includes an arcuate top wall portion 45 which is directed transversely of the entranceway 11. The mixing chamber, in effect, forms a part of an air discharge plenum 46 which extends transversely across the entranceway toward the side wall 12 and which is formed from vertical side walls and an increasingly stepped-in top wall with the main wall portion thereof including the discharge grating 21. Generally, the configuration of the top wall of the plenum 46 is such that a plurality of air stream interception baffle-like means are provided, these means being arranged in opposition to the initial direction of air stream supplied from the mixing chamber 44. Furthermore, the interception means are of progressive continuous step-like projections which basically selectively intercept varying air stream strata, as will be described in greater detail, for redirection thereof through the discharge grating 21 and into the passageway or entranceway 11. The step-like projections result in the decreasing of the total area of the discharge plenum 46 in a direction toward the side wall 12.

Figure 6:
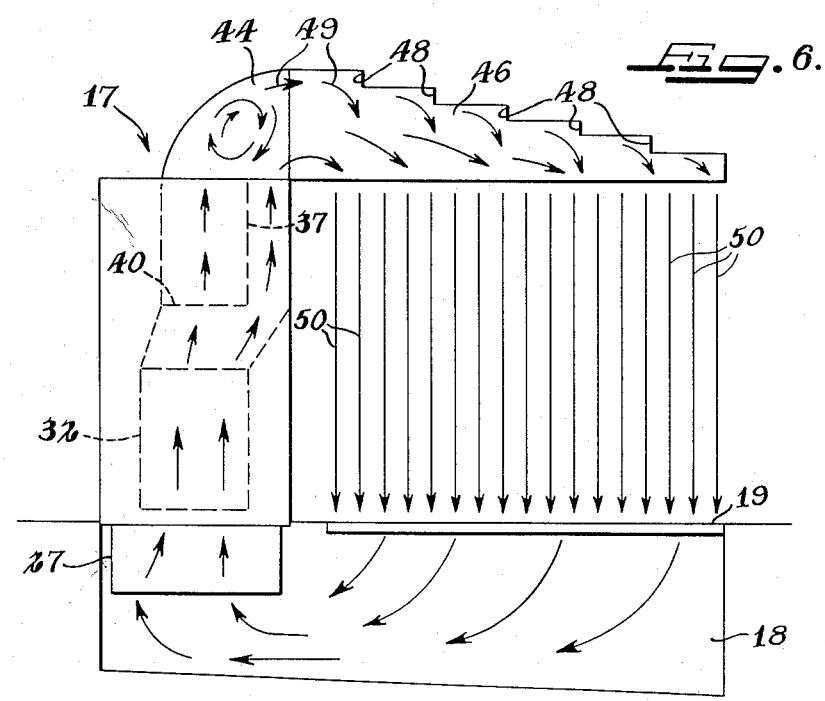
FIG. 6 is a transverse diagrammatic illustration of the air screen structure illustrating the method of operation of the present invention.

Specifically, the controlled air flow baffle arrangement of the top wall of the discharge plenum 46 is defined by cooperating, alternately spaced, horizontal wall sections 47 and interconnecting vertical wall sections 48. These sections are arranged to progressively step down the top of the plenum to an extent that the final height thereof at the furthermost end thereof is very materially reduced. FIG. 6 diagrammatically illustrates the functioning of this baffle arrangement in connection with overall functioning of the air screen structure. Air is moved upwardly toward the discharge plenum 46 by the fans 32. The upwardly moving stream of air is subdivided by the baffle 37 to pass a portion thereof through a heater 40 and by-pass the remaining portion as cold or cool air. The air portions are recombined in the mixing chamber 44 and are mixed substantially therein to an extent that uniformly heated air flows from the mixing chamber into the discharge plenum 46. The air flowing into the discharge plenum 46, for purposes of description, may be considered as consisting of a plurality of vertical layers or strata. The topmost stratum identified by the arrows 49 immediately is confronted by the first step 48 and is redirected by this step downwardly toward the discharge grating. This redistricted stratum then moves into the lower strata with the result that air is immediately redirect through the first portion of the discharge grating. Intermediate strata will progressively be redirected by the remaining steps 48 as illustrated by the arrows in FIG. 6. Remaining lower strata of air are progressively redirected downwardly through the grating to result in uniform distribution of air discharge from the plenum 46. The steps 48, in effect, establish pressure pockets causing air directed toward the same to change direction downwardly with resultant controlled downward redirection of lower layers of air flowing across the plenum. The air screen established is indicated by the arrows 50. This screen continuously flows downwardly transversely to the entranceway 11 and is drawn through the return grating 19 into the pit 18 and upwardly through the filter unit 27. The foregoing explanation is obviously a simplification of the actual phenomena occurring, although such explanation is considered to be basically accurate.

Another important aspect of the invention resides in the provision of a special form of air discharge grating 21 shown specifically in FIG. 7. For uniformity of air screen operation and to obtain maximum efficient control thereof, it has been found important to provide vertical directional control to the air discharge from the plenum 46. The grating 21 includes a grill 51 formed from a plurality of parallel strips or plates 52 and 53 arranged at right angles to one another to define therebetween a network of chimney-like vertically directed air flow passages which are of sufficient vertical length to stabilize air discharge outwardly of the plenum in a fixed vertically downward pattern. The grill 51 is, in effect, an air flow straightener which directs air vertically downward and smooths out the air flow issuing from the plenum 46. Preferably, the plates 52 and 53 are of a width of about 1 inch and are spaced in parallel relation at a distance of about 1 inch thus providing the honeycomb-type arrangement with passages of approximately 1 cubic inch. The grill 51 is fixed in the discharge opening of the plenum 46 and does not function in any respect to vary the direction of air discharge therefrom during operation of the air screen structure.

Preferably, a perforated air distribution plate 54 extends directly below the grill 51 in overlying relation. Any suitable type of perforations or apertures may be formed in the plate 54 but, preferably, the apertures are in the form of relatively large slots 55 which may be staggered. The plate 55 aids in uniformly distributing air flow downwardly across the entranceway 11 and also maintains a back pressure in the discharge plenum 46. As with the grill 51, the plate 54 is fixed under all conditions of operation.

The grating is preferably completed with the provision of transversely spaced, depending air stabilizing fins 56 of known type which are suitably attached below the plate 54 and which extend longitudinally of the entranceway 11 as best illustrated in FIG. 2. Each fin 56 is of open top construction formed with parallel depending side walls terminating in converging side walls closing off the bottom edge of the fin. This design contributes to the overall lightweight characteristics of the air screen structure bearing in mind that the various elements of the discharge grating 21 may be readily formed from lightweight aluminum. The fins 56 may be spaced from one another to an extent of about 3 7/16 inches. The combined elements of the grating 21 function to establish sheet-like stream of air directed vertically downward from the plenum 46, the sheets cooperatively merging at sufficient velocity downwardly across the entranceway to form an air barrier which is impregnable under substantial variable pressure differential conditions, the barrier being capable of preventing the entry of debris or dirt into the building.

FIG. 8 illustrates another form of air discharge grating 57. This grating is in principal the same as the grating 21 previously described and includes a grill 58, an overlying distributor plate 59 and a plurality of transversely spaced, longitudinally extending stabilizing fins 60. The grill 58 is in the form of a true honeycomb having hexagonal chimney-like openings staggered relative to one another. The hexagonal portions 61 include common side walls and the grill 58 may be readily formed by punching and pressing from sheet stock. The distributor plate 59 includes transversely extending slots 62 which function in the same manner as the slots 55 previously described. However, it will be noted that the slots 62 extend transversely of the entranceway 11 thus providing for the formation of transverse sheet-like streams of air discharged from the plenum. The stabilizing fins 60 extend longitudinally of the entranceway 11 in the same manner as previously described. While certain specific forms of discharge gratings have been described, it will be understood that any suitable grating capable of performing the desired function may be used in the structure of the present invention. It will be appreciated that the special plenum structure described above permits advantageous use thereof with many different types of gratings and such use is not limited solely to the specific form of grating disclosed herein.

FIG. 9 best illustrates the compactness and advantages of design of the prefabricated air moving and discharge unit 17 of the invention. This unit is readily installed in a building in the manner illustrated in FIGS. 1 and 3. The unit is complete except for the cooperating building structure, such as the return pit 18, and requires relatively little space compared to the overall operational effect thereof. The stepped plenum 46 not only constitutes a substantial operational improvement but also is advantageous with regard to fabrication of the overall structure. This design materially reduces the complexities of installation as the box-like overhead structure 15 provided by the purchaser need not be prepared to close specifications to accomplish proper air flow control. In other words, the purchaser merely need provide space to install the unit 17 and all close dimensions as well as exact engineering requirements are incorporated in the unit per se and need not be explained to or exacted from the purchaser.

The special air discharge plenum design described assures uniform air distribution over the air discharge grating 21 as previously described. In earlier existing units it has been found that air discharge voids are present, often throughout the air discharge grating, but particularly in the area of the grating immediately adjacent to the main air supply or heater. In earlier structures it has been found that the cold by-passed air tends to accumulate in the top of the plenum with the result that the far end of the plenum, adjacent the side wall 12 of the entranceway, is substantially filled with cold air. The heated air was forced down into the center ⅓ of the discharge grating and the remaining ⅓ of the discharge grating near the air moving equipment was subjected to a void having little or no air. This particular pattern of distribution produced high velocity air at one end of the discharge grating, the velocity diminishing to virtually zero at the other end of the grating.

An important aspect permitting elimination of the foregoing problems resides in the basic reduction of area toward the far end of the plenum. However, this aspect is not, in itself, sufficient to eliminate the problems. The provision of the continuous stepped-down baffle arrangement not only completely eliminates the problems but also readily accommodates utilization of the feature of area reduction toward the far end of the plenum. It has been found important also to locate the heating unit and cold air by-pass arrangement below the plenum and not permit direct introduction of the separate streams of air into the plenum for immediate discharge therefrom. Thus, the provision and location of the mixing chamber 44 are of material importance in providing uniformity in air flow and temperature. The resulting arrangement not only completely eliminates the establishment of any voids across the air discharge grating, but it also permits compactness in design and improves the availability of the heater and other operating units for maintenance. In other words, the heating unit used is of vertical flow type thus permitting positioning for ready access while additionally providing improved functioning by direction of the hot and cold air streams into a mixing chamber prior to introduction thereof into the plenum.

The following is an example of proper dimensioning of the components of the plenum 46 under given design requirements of an installation. The plenum 46 may be of a length of about 107 inches, a width of about 76⅝ inches, a maximum height of about 24 inches and a minimum height of about 7 inches for an entranceway of approximately 8 feet square. Under such conditions the vertical wall portions 48 of the top wall of the plenum would be spaced from one another approximately 11 inches and would be of an approximate height of 2 inches. This would provide 7 steps as shown in FIG. 9. The degree of perforation of the distributor plates 54 and 58 is selected for a unit of given size to provide the desired plenum back pressure and velocity of air discharge.

As previously described, the earlier concept of air screen definition and control involved the use of an adjustable air discharge grating including means such as tiltable vanes. The object was to provide for adjustment of the position of the vanes to direct air discharge therethrough toward the greatest pressure, either internal or external. This concept has been proven impractical as it is not sufficiently sensitive to immediately adjust to many different aspects of variation and operation and therefore leaves much to be desired. By way of example, it has been found that conditions can exist whereby the air screen is forced into the building to an extent that the air defining the same is not picked up for return by the pit and exterior hot air is drawn into the pit and distributed within the building which is normally mechanically cooled. Such a situation is obviously undesirable.

FIGS. 10 and 11 illustrate operational aspects utilizing the new concept of air screen definition and control. As previously described, the air introduced into the plenum 46 is uniformly distributed across the discharge grating 21 and discharged vertically downward therefrom directly toward the return grating 19. The air is discharged at a sufficient velocity and the screen defined thereby is of sufficient depth to prevent rupture thereof by changing pressure conditions externally of the building. Ideal operational conditions result in complete 100% capture of the air screen in the pit 18 thus reducing the conditioning and heating requirements of the structure. The prior art tiltable vane concept of operation results in a considerably reduced percentage of recaptured conditioned air. FIG. 10 illustrates the vertically downward operation of the air screen with the air discharge grating 21 being coextensive with an air return grating 19. Interior and exterior air designated by the curved arrows does not penetrate the screen to any extent and no appreciable entrainment occurs because of this phenomena. The interior and exterior air is, in effect, swirled and redirected away from the air screen.

FIG. 11 illustrates operation of the air screen under adverse conditions. Assuming a substantial differential pressure existing between the interior and exterior of the building such as caused by strong external winds, the screen defined by the structure is of sufficient velocity and depth to withstand directly impinging winds and prevent rupture. The substantially controlled vertically downward discharge of the air defining the screen is responsible for the desirable results obtained. Thus the specially constructed air distributing plenum cooperates with the chimney-like effect of the discharge grating 21 to uniformly distribute and stabilize downwardly directed air streams to form a virtually impregnable air screen. Extreme external pressure conditions can result only in slight translation of the screen inwardly of the building as indicated by the arrows in FIG. 11. External air which becomes entrained in the screen is picked up in the pit and conditioned and heated in the structure for recirculation. Any substantial penetration of external air, such as directly below the discharge grating 21, cannot completely pierce the screen and is eventually redirected downwardly to be picked up in the pit 18. Slight translation of the screen results in minor loss of conditioned and heated air into the interior of the building but the temperature of this air is such that discomfort of persons within the building does not occur.

Thus, the controlled straight line flow of the air streams making up the total air screen provides new and improved results. These results are evidenced by smoke tests wherein smoke is released at the ceiling level inside the screen and is carried directly downwardly into the pin in a completely controlled manner. Smoke released toward the screen adjacent an end thereof moves slowly toward the screen until it reaches the outer perimeter of the screen and is then partially driven downwardly while being substantially spilled onto the floor adjacent one end of the return grating 19. The smoothness of air flow is quite apparent and a person standing within the barrier is not adversely affected by this flow.

Obviously certain modifications and variations of the invention as hereinbefore set forth may be made without departing from the spirit and scope thereof, and therefore only such limitations should be imposed as are indicated in the appended claims.

We claim:

1. In an air screen structure wherein a circulating air stream establishes a barrier across a passageway, said structure including an overhead air discharge plenum extending transversely of said passageway and having an air screen defining discharge grating means forming the bottom wall thereof and permitting the introduction of air downwardly into said passageway, an air return plenum positioned opposite said discharge grating means across said passageway in the floor thereof, an air circulating means interconnecting said air return and discharge plenums and located out of said passageway, the improvement comprising the provision of an air mixing chamber forming the upper end of said air circulating means and in communication with said discharge plenum, combination air heating and by-pass means in said circulating means below said mixing chamber and located no higher than said grating means, the top wall portion of said discharge plenum progressively approaching said grating means in opposition to the initial direction of air stream flow which upon introduction thereinto is generally from one end thereof from said mixing chamber and in a direction across said passageway, said discharge plenum being of decreasing total air flow area in the direction of air stream flow.

2. The air stream structure of claim 1 wherein said grating means includes a plurality of fixed vertical chimney-like members which subdivide the air discharge therethrough into streams and vertically direct the same toward said return plenum.

3. An air discharge plenum for use in a recirculating type of air screen structure, said plenum comprising an air discharge chamber, and air discharge grating means extending across the bottom of said discharge chamber, the top wall portion of said plenum directly opposite said grating means defining a series of continuous and progressively downwardly projecting stepwise baffle means progressively reducing the total air flow area of said discharge chamber toward one end thereof, said baffle means opposing the flow of air introduced at the other end of said plenum to redirect the same downwardly through said grating means in a uniform manner to maintain air discharge at uniform velocity throughout, said grating means comprising a transversely continuous apertured plate means which establishes air stream flow therethrough and which maintains a back pressure in said plenum.

4. An air discharge plenum for use in a recirculating type of air screen structure, said plenum comprising an air discharge chamber, and air discharge grating means extending across the bottom of said discharge chamber, the top wall portion of said plenum directly opposite said grating means defining a series of continuous and progressively downwardly projecting stepwise baffle means progressively reducing the total air flow area of said discharge chamber toward one end thereof, said baffle means opposing the flow of air introduced at the other end of said plenum to redirect the same downwardly through said grating means in a uniform manner to maintain air discharge at uniform velocity throughout, said grating means comprising a network of fixed chimney-like vertically directed means defining air flow passages of sufficient length to stabilize air discharge outwardly from said plenum.

5. An air discharge plenum for use in a recirculating type of air screen structure, said plenum comprising an air discharge chamber, and air discharge grating means extending across the bottom of said discharge chamber, the top wall portion of said plenum directly opposite said grating means defining a series of continuously and progressively downwardly projecting stepwise baffle means progressively reducing the total air flow area of said discharge chamber toward one end thereof, said baffle means opposing the flow of air introduced at the other end of said plenum to redirect the same downwardly through said grating means in a uniform manner to maintain air discharge at uniform velocity throughout, said grating means comprising a network of fixed chimney-like vertically directed means defining air flow passages of sufficient length to stabilize air discharge outwardly from said plenum, and a transversely continuous apertured plate means outwardly of said air flow passages and overlying the same, said plate establishing air stream flow therethrough and maintaining a back pressure in said plenum.

References Cited in the file of this patent

UNITED STATES PATENTS

| | | |
|---|---|---|
| 2,574,844 | Roden | Nov. 13, 1951 |
| 2,632,310 | Kopp | Mar. 24, 1953 |
| 2,955,521 | Kurek | Oct. 11, 1960 |
| 3,021,775 | Gygax | Feb. 20, 1962 |
| 3,023,688 | Kramer | Mar. 6, 1962 |

FOREIGN PATENTS

| | | |
|---|---|---|
| 429,656 | Italy | Feb. 2, 1948 |